Figure 1:
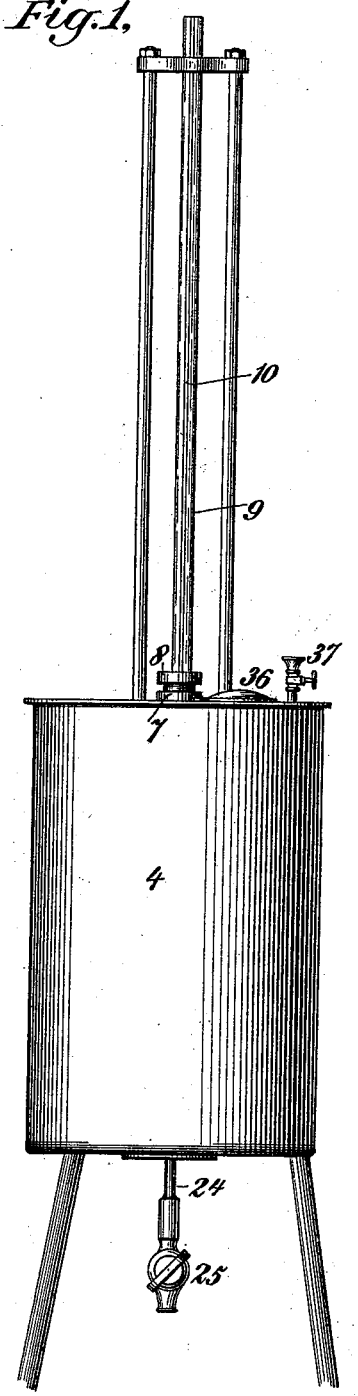

(No Model.) 3 Sheets—Sheet 1.

R. C. CARPENTER.
CALORIMETER.

No. 550,943. Patented Dec. 10, 1895.

Witnesses:-

Inventor:-
Rolla C. Carpenter
By E. M. Marble & Son
His Attorneys.

(No Model.) 3 Sheets—Sheet 2.

R. C. CARPENTER.
CALORIMETER.

No. 550,943. Patented Dec. 10, 1895.

Witnesses:-
O. H. Hayward
L. M. Marble

Inventor:-
Rolla C. Carpenter
By E. M. Marble & Sons
His Attorneys.

ANDREW B.GRAHAM. PHOTO-LITHO. WASHINGTON, D.C.

(No Model.)  3 Sheets—Sheet 3.

R. C. CARPENTER.
CALORIMETER.

No. 550,943.  Patented Dec. 10, 1895.

Witnesses:

Inventor:
Rolla C. Carpenter
By E. M. Marble & Sons
His Attorneys.

UNITED STATES PATENT OFFICE.

ROLLA C. CARPENTER, OF ITHACA, NEW YORK.

CALORIMETER.

SPECIFICATION forming part of Letters Patent No. 550,943, dated December 10, 1895.

Application filed May 1, 1895. Serial No. 547,792. (No model.)

*To all whom it may concern:*

Be it known that I, ROLLA C. CARPENTER, a citizen of the United States, residing at Ithaca, in the county of Tompkins and State of New York, have invented certain new and useful Improvements in Calorimeters; and I do hereby declare the following to be a full, clear, and exact description of the invention, such as will enable others skilled in the art to which it appertains to make and use the same.

My invention relates to calorimeters, and, while it is applicable to calorimeters generally, it is particularly intended for that class of calorimeters known as "fuel" or "coal" calorimeters, which are used to determine the calorific value of coal or other fuel.

My invention consists in the novel means employed for measuring the amount of heat imparted to the fluid within the calorimeter; in the novel means employed for adjusting the indicating mechanism of the calorimeter; in the novel means provided for charging the calorimeter, and in the novel construction, combination, and arrangement of the parts constituting the calorimeter.

Calorimeters heretofore used have consisted, essentially, of a vessel containing some fluid, usually water, to which heat may be imparted. If the calorimeter is used for determining the specific heat of a substance or for determining the temperature of a furnace, it is done by placing a known quantity of water within the calorimeter and immersing therein a heated body. If the calorimeter is used for determining the calorific value of a fuel, it is done by immersing in the water within the calorimeter a specimen of the fuel, usually contained within a water-tight case, and burning the fuel within the calorimeter. In both cases heat is imparted to the water in the calorimeter and the specific heat of the body tested. The temperature of the furnace or the calorific value of the fuel, as the case may be, is determined by measuring the amount of heat imparted to the water. Heretofore the amount of heat thus imparted has been measured by observing the rise in temperature of the water, this rise in temperature being measured by one or more thermometers immersed in the water, and to obtain uniform results and to avoid, so far as possible, errors due to differences in temperature in different portions of the calorimeter it has been customary to stir the water violently throughout the test. In spite of this fact, however, it has been found that the results thus obtained are only approximate, different thermometers immersed in the same calorimeter frequently reading quite differently, so that accurate observations are impossible.

By my invention I provide a new method for measuring the amount of heat imparted to the water within the calorimeter and which is not subject to the errors and inaccuracies above specified, besides rendering it possible to produce a calorimeter which is more easy to use. Instead of measuring the rise of temperature of the water, due to the heat imparted to it, I measure the expansion in volume of the water, due to the heat imparted to it, and, since the coefficient of expansion of water is accurately known, it is as easy to determine the number of thermal units imparted to a known weight of water by measuring its increase in volume as it is by measuring its increase in temperature.

The calorimeter consists, essentially, of a vessel closed on all sides and at the top, through which rises a tube of transparent material having a small bore, this bore communicating with the water within the calorimeter. The calorimeter is filled completely with water, so that the water rises partly into this gage-glass before commencing the test. When heat is imparted to the water, the water will expand in volume, rising up higher in the gage-glass, thereby indicating the increase in volume, and from the increase thus noted the amount of heat imparted to the water may be verified. This method has the important advantage that it is not subject to inaccuracies and uncertainties due to variations in temperature of different portions of the body of water within the calorimeter, the rise of water in the gage-glass being a measure of the average expansion of the water throughout the calorimeter.

The objects of my invention are, first, to provide a calorimeter capable of giving more accurate determinations than those heretofore used; second, to provide a calorimeter which shall be more simple and easy of operation than those heretofore used; third, to provide improved means for measuring the amount of heat imparted to the calorimeter; fourth, to provide an improved chamber within the calorimeter, within which fuels may be burned, and to provide an improved means for imparting the heat produced by this combustion to the water within the calorimeter; fifth, to provide improved means for introducing charges of combustible into this combustion-chamber; sixth, to provide improved means for observing the progress of the combustion within this chamber, and, seventh, to provide a calorimeter which shall be simple and as inexpensive as possible, durable, accurate, and easy of use and adjustment. These objects are attained in the calorimeter herein described and illustrated in the drawings which accompany and form a part of this application, in which the same reference-numerals indicate the same or corresponding parts, and in which—

Figure 2:
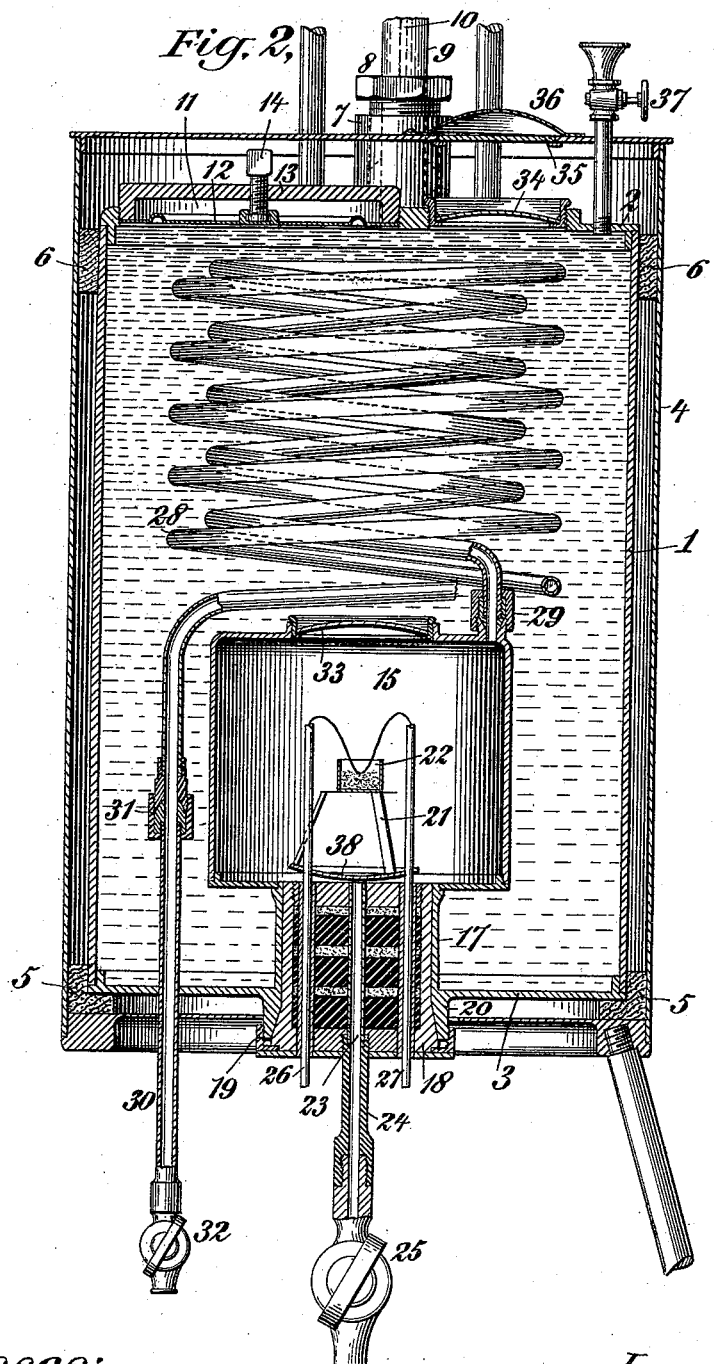
Figure 3:
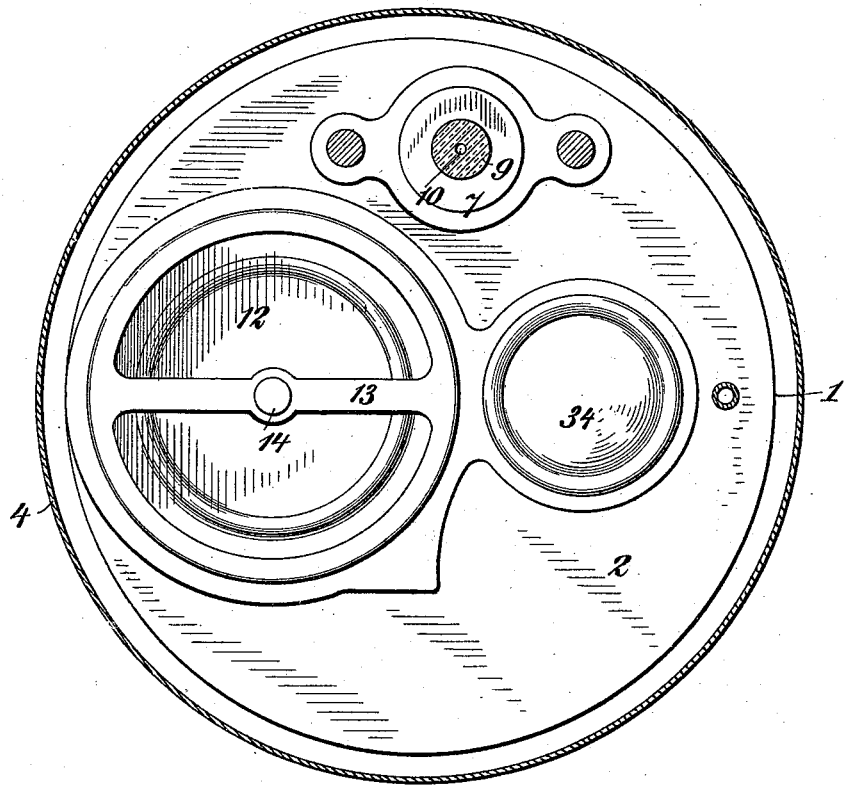
Figure 4:
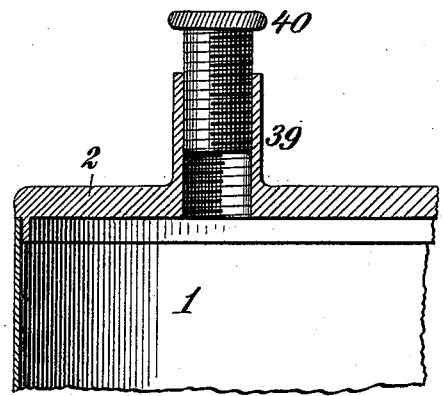

Figure 1 is an elevation of my fuel-calorimeter. Fig. 2 is a sectional elevation of the calorimeter, showing the fluid chamber, the combustion-chamber, the gage-tube by which the expansion of water within the calorimeter is measured, the diaphragm for regulating the height of the water within this gage-tube, and the peep-holes through which the progress of combustion is observed. Fig. 3 is a view of the top of the calorimeter, the inclosing case thereof being shown in section; and Fig. 4 illustrates a modified device for adjusting the height of the water within the calorimeter.

In the drawings, 1 is the main or fluid chamber of the calorimeter and is a cylindrical chamber closed at the top and bottom by a cover 2 and bottom plate 3. This chamber 1 is contained within an outer case 4, somewhat larger than the chamber 1, so as to leave an air-space between the casing and chamber.

The chamber 1 rests upon pieces of felt or other suitable insulating material 5 upon the bottom and sides of the casing 4, and other pieces of felt 6 near the top of the chamber prevent any contact between the chamber 1 and outer casing. The cover 2 of the fluid-chamber has a stuffing-box 7 and gland 8, through which passes a gage-tube 9, having a small internal bore 10, communicating with the interior of the chamber 1, the stuffing-box and gland preventing leakage of either water or air. The top 2 of the chamber 1 is likewise provided with an aperture, into which is screwed a ring 11, carrying a flat diaphragm 12. The ring likewise has a bridge 13, through which passes an adjusting-screw 14, the end of which is secured to this diaphragm. Within the chamber 1 is the combustion-chamber 15, which likewise is a closed chamber and is supported by a tubular column 17, forming part of the bottom plate 3, so that water within the calorimeter surrounds this combustion-chamber almost entirely. The column 17 is hollow and is provided with a plug 18, the top of which, when the plug is in place, forms a portion of the bottom of the combustion-chamber. This plug consists of a metal cylinder filled with alternate layers of hard rubber and asbestos or other non-conducting material, so that while it is strong heat is not readily conducted through it. It is held in place by a ring 19, screwed upon the end of a cylindrical boss 20, forming a portion of the bottom plate 3. The plug 18 supports a stand 21, upon which may be placed a capsule 22, containing the charge of combustible to be tested. A pipe 23, passing through the plug 18, one section, 24, of which should be of hard rubber or other insulating material, is used to supply air, oxygen, or other suitable gas for combustion within the combustion-chamber. This pipe is provided at the end with a cock 25. Wires 26 and 27, for igniting the combustible electrically, may likewise pass through this plug. Above the combustion-chamber 15 is a pipe-coil or worm 28, one end of this worm communicating with the interior of the combustion-chamber 15 through a coupling 29. The other end of the worm is connected to a pipe 30, leading to the outside of the calorimeter by another coupling 31. The products of combustion of the charge in the capsule 22 pass through this worm 28 into the outside air, in so doing imparting the heat produced by combustion or a definite proportion thereof to the water in the calorimeter. A valve 32 on the end of the pipe 30 may be used for regulating the pressure under which the combustion takes place. On the top of the combustion-chamber 15 is placed a glass window or peep-hole 33. In the top of the fluid-chamber 1 is a corresponding window, and above this window in the outer casing 4 there is another window 35, which may have a removable cover 36. Windows 33, 34, and 35 are so situated with reference to each other that it is possible for the operator to look through these windows and observe the progress of the combustion within the chamber 15. A cock 37 is provided for filling the calorimeter with water.

The operation of my calorimeter is as follows: The calorimeter is filled with water through the cock 37 until the water rises sufficiently far in the gage-glass 9 as to be visible above the top of the gland 8. This is done somewhat carefully, so as to remove all of the air within the calorimeter and leave no air-bubbles therein. By weighing the calorimeter before and after filling, the exact quantity of water which is required to fill it may be determined, if necessary. By turning the screw 14 the water in the gage-glass 9 may be brought to a definite zero-mark. The plug 18 is then removed, a known quantity of the fuel to be tested is placed within the capsule 22, and the plug is reinserted into the calorimeter. The cock 25 is then connected with a source of oxygen or other suitable gas for maintaining combustion within the chamber 15. The valve 32 on the pipe 30 is adjusted to produce the desired back-pressure, and the fuel in the capsule 22 is ignited by passing an electric current through the wires 26 and 27, or in any other suitable way. By looking through the windows 32 and 34 the operator may determine whether ignition takes place. As the fuel is consumed, the heated products of combustion pass up through the coil 28 and so into the outer air, imparting, as they do so, all, or nearly all, of the heat produced by combustion to the water within the chamber 1. The water in this chamber being heated thereby expands, increasing in volume and causing the level of the water in the gage-glass 9 to rise. Knowing the relation of the diameter of the bore 10 of this tube 9 to the volume of the chamber 1, and observing the temperature of the gases of combustion as they pass out of the pipe 30, and introducing suitable corrections for the expansion of the walls of the chamber 1, it is possible to determine accurately the amount of heat imparted to the water. For most purposes, however, it will be sufficient to calibrate the calorimeter by burning within it a known quantity of fuel of known calorific value and comparing the expansion of the water produced thereby with the expansion produced by the combustion of the substance tested. A scale may be engraved upon or placed adjacent to the gage-glass, from which the calorific value of a standard weight of fuel may be read directly.

The bottom of the combustion-chamber 15 may be provided with a reflector 38 for reflecting radiant heat and preventing it from passing through the plug 18.

In Fig. 4 is shown a modified device for adjusting the height of the water within the gage-glass and which may be substituted for the diaphragm 12. (Shown in Fig. 2.) The top plate 2 of the fluid-chamber is provided with a boss 39, into which screws a plunger 40. By turning this plunger backward or forward the water may be caused to rise or fall in the gage-glass.

It is obvious that where my calorimeter is to be used for determining the specific heat of substances or for determining the temperature of a furnace by immersing in the calorimeter heated bodies the combustion-chamber 15, coil, and parts connected therewith are not required. The heated bodies may be introduced directly into the calorimeter, suitable corrections being made for the water displaced thereby; or the heated bodies may be introduced into the combustion-chamber 15 and other suitable corrections for the water displaced by these bodies being made, the method herein described of measuring the heat imparted to the water within the calorimeter—viz., by measuring the increase in volume of the water—being applicable to all these uses.

Having thus completely described my invention, what I claim, and desire to secure by Letters Patent, is—

1. In a calorimeter, the combination, with a closed fluid chamber, of a combustion chamber located therein and arranged to impart the heat produced by combustion to the fluid within said fluid chamber, and a volume measuring device connected with said fluid chamber and arranged to indicate variations in the volume of said fluid, substantially as described.

2. In a calorimeter, the combination, with a closed fluid chamber, of a combustion chamber located therein and arranged to impart the heat produced by combustion to the fluid within said fluid chamber, and a gage glass communicating with said fluid chamber and arranged to indicate variations in the volume of said fluid, substantially as described.

3. In a calorimeter, the combination, with a closed fluid chamber, of a combustion chamber located therein and arranged to impart the heat produced by combustion to the fluid within said fluid chamber, a gage glass communicating with said fluid chamber and arranged to indicate variations in the volume of the fluid therein, and means for adjusting the height of the fluid within said fluid chamber, substantially as described.

4. In a calorimeter, the combination, with a closed fluid chamber, of a combustion chamber located therein and arranged to impart the heat produced by combustion to the fluid within said fluid chamber, a gage glass communicating with said fluid chamber and arranged to indicate variations in the volume of the fluid therein, a flexible diaphragm forming a portion of a wall of said chamber, and means for pressing said diaphragm inward and outward, thereby varying the volume of said fluid chamber and adjusting the height of the fluid within said gage glass, substantially as described.

5. In a calorimeter, the combination, with a fluid chamber, of a combustion chamber located therein, a column connected to the walls of said fluid chamber and combustion chamber, an aperture in said column communicating with the interior of the combustion chamber, and a plug of insulating material closing said aperture and removable therefrom and arranged to prevent the radiation of heat, whereby access may be gained to the interior of said combustion chamber without breaking a joint in the walls of said fluid chamber, substantially as described.

6. In a calorimeter, the combination, with a fluid chamber, of a combustion chamber located therein, a passage for charging said combustion chamber passing through the bottom of said fluid chamber, and a plug of heat insulating material closing said passage and removable therefrom and arranged to prevent the radiation of heat, and forming a portion of the bottom of the combustion chamber, whereby said combustion chamber may be charged without breaking a joint in the walls of the fluid chamber, substantially as described.

7. In a calorimeter, the combination, with a fluid chamber, of a combustion chamber located therein, a passage for charging said combustion chamber passing through the bottom of said fluid chamber, a plug of heat insulating material closing said passage and removable therefrom, and forming a portion of the bottom of the combustion chamber and arranged to prevent the radiation of heat, whereby said combustion chamber may be charged without breaking a joint in the walls of the fluid chamber, and a pipe passing through said plug, through which gas may be introduced to support combustion, substantially as described.

8. In a calorimeter, the combination, with a closed fluid chamber, and means for indicating variations in the volume of fluid within said chamber, of a combustion chamber within said fluid chamber, and a pipe communicating with said combustion chamber and with the outside air, and passing through the combustion chamber, for the passage of the products of combustion, substantially as described.

9. In a calorimeter, the combination, with a closed fluid chamber, and a gage glass communicating therewith and arranged to indicate variations in the volume of fluid within said chamber, of a combustion chamber within said fluid chamber, a pipe communicating with said combustion chamber and with the outside air and passing through the fluid chamber, for the passage of the products of combustion, and means for supplying gas to said combustion chamber to support combustion, substantially as described.

10. In a calorimeter, the combination, with a closed fluid chamber, and a gage glass communicating therewith and arranged to indicate variations in the volume of fluid within said chamber, of a combustion chamber within said fluid chamber, a pipe communicating with said combustion chamber and with the outside air, and passing through the fluid chamber, for the passage of the products of combustion, and an outer casing surrounding said fluid chamber and insulated therefrom, and forming an air space around said fluid chamber, substantially as described.

11. In a calorimeter, the combination, with a closed fluid chamber having an opening through which may be introduced substances to be tested, and means for closing said opening, of a gage tube of small diameter extending upwardly from said fluid chamber, and means for varying the volume of said fluid chamber, thereby varying the height of water within said gage tube, substantially as described.

In testimony whereof I affix my signature in presence of two witnesses.

ROLLA C. CARPENTER.

Witnesses:
CLARENCE L. SMITH,
ROBERT M. WOOL.